United States Patent [19]

Glover

[11] 3,845,832
[45] Nov. 5, 1974

[54] POWER TAKE-OFF CONNECTION

[75] Inventor: John W. Glover, Raleigh, N.C.

[73] Assignee: Darf Corporation, Edenton, N.C.

[22] Filed: Dec. 6, 1971

[21] Appl. No.: 205,193

[52] U.S. Cl. .................... 180/14 R, 74/11, 172/103, 192/46, 280/420
[51] Int. Cl. ............................................. B60d 1/00
[58] Field of Search .... 180/14 R, 14 B, 53 R, 53 C; 74/11, 15.6; 280/420; 172/103; 192/46; 214/44 VT

[56] References Cited
UNITED STATES PATENTS
2,507,742   5/1950   Tuft ............................... 214/44 VT 3,233,471   2/1966   Benson et al. ..................... 172/103
3,557,892   1/1971   Burrough ......................... 180/14 R

*Primary Examiner*—M. Henson Wood, Jr.
*Assistant Examiner*—Richard A. Bertsch

[57] ABSTRACT

A universally jointed telescopic drive line connects the power take-off of a tractor to a driven shaft of a power-driven implement which is drawn by the tractor through a pivotal hitch. The pivot point of the hitch is located midway between universal joints of the drive line for proper geometric alignment and smooth operation of the joints. The drive line also includes an over-running clutch which prevents transmission of torque from the implement back to the tractor when the tractor is stopped.

5 Claims, 21 Drawing Figures

INVENTOR
JOHN W. GLOVER

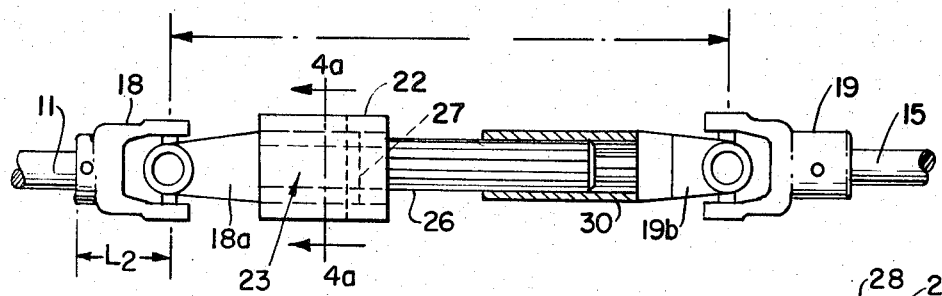
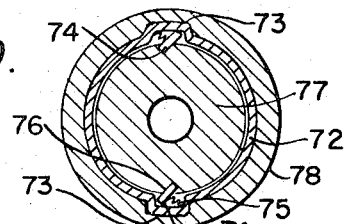
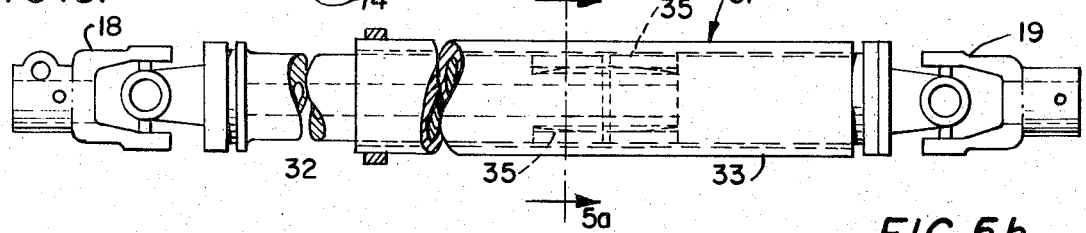
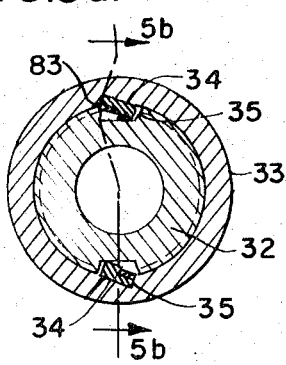
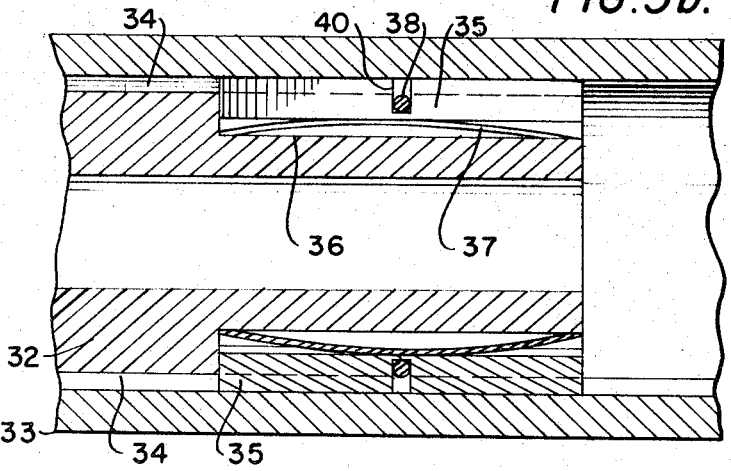
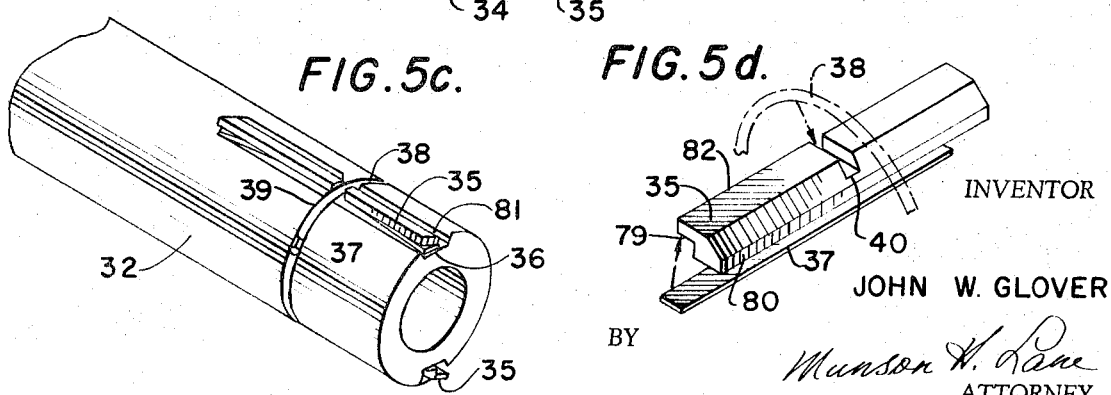
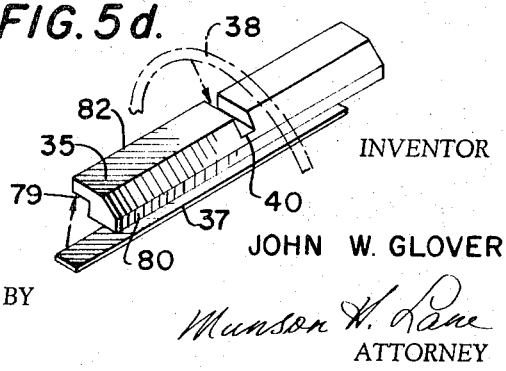

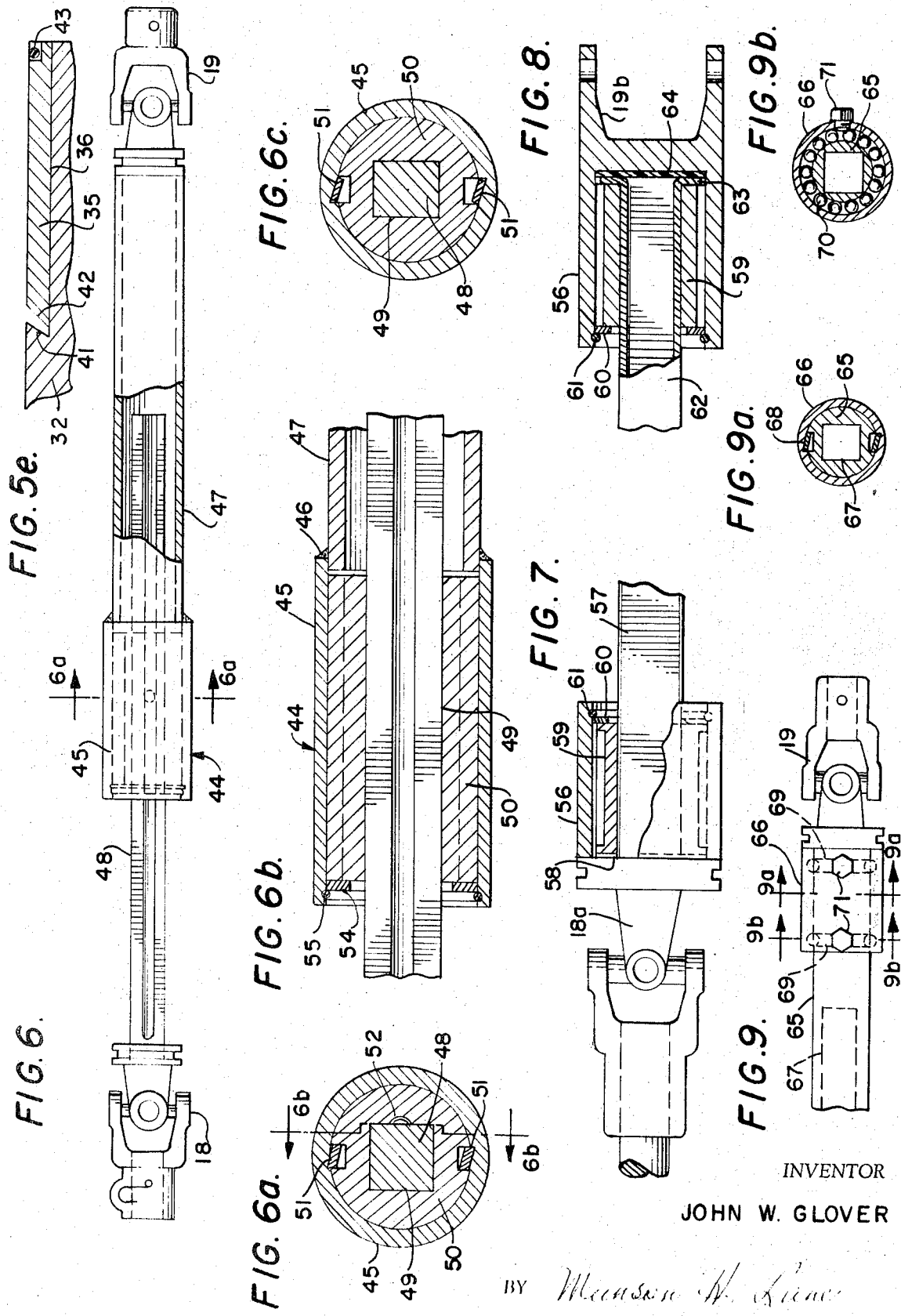

3,845,832

POWER TAKE-OFF CONNECTION

This invention relates to new and useful improvements in the art of transmission of torque, and in particular the invention concerns itself with an improved drive line for connecting the power take-off shaft of a tractor to a driven shaft of a power-driven implement drawn by the tractor, as for example, a mowing machine, a combine, a cultivator, a snow blower, and the like.

In making such an operative connection, it is customary in the art to employ a universally jointed telescopic drive line between the power take-off shaft of the tractor and the driven shaft of the drawn implement, it being understood that the implement is drawn by the tractor through the medium of a conventional pivotal hitch and that the universally jointed and telescopic characteristics of the drive line are desirable, if not necessary, to compensate for different geometric relationships between the two vehicles, as for example when negotiating a curved path or turning around.

One important object of the invention is to coordinate the universally jointed telescopic drive line with the pivotal hitch between the tractor and the drawn implement in such manner that the universal joints of the drive line always operate at the same angular relationship with respect to each other, regardless of what the angle may be in any given situation, thus facilitating a highly efficient transmission of torque without vibration such as could be damaging to the drive line as a whole.

Also, it is known in the art to provide an over-running clutch in the drive line, so that when the tractor is stopped, inertial torque is not transmitted from the drawn implement back to the tractor. One example of this known arrangement appears in the power take-off connection disclosed in U.S. Pat. No. 3,233,471 issued Feb. 8, 1966 to A. I. Benson et al. Thus, another important object of the present invention is to provide a universally jointed telescopic drive line which embodies an over-running clutch.

In one embodiment of the invention, the over-running clutch is disposed outside of the universal joints which are located at the ends of a telescopic shaft unit, and thus the operation of the clutch does not alter the geometric relationship between the yokes of the joints at the ends of the shaft unit, it being desirable for such yokes to be disposed in a common plane during transmission of torque, so that smooth and vibration-free operation is attained. However, in other embodiments of the invention the over-running clutch is embodied within the telescopic shaft unit, so that the desirable coplanar relationship of the universal joint yokes would very likely be destroyed by operation of the over-running clutch. Accordingly, in conjunction with the foregoing objects, another important object of the invention is to provide an arrangement in which the desired coplanar relationship of the universal joint yokes is not disturbed by operation of the over-running clutch embodied in the telescopic shaft of the drive line.

With the foregoing more important objects and features in view and such other objects and features which may become apparent as this specification proceeds, the invention will be understood from the following, description taken in conjunction with the accompanying drawings, in which like characters of reference designate like parts, and in which:

FIG. 4 is a view, partly in elevation and partly in section, showing a modified embodiment;

FIG. 4a is a cross-sectional view, taken substantially in the plane of the line 4a–4a in FIG. 4;

FIG. 5 is an elevational view of another modified embodiment;

FIG. 5a is a cross-sectional view, taken substantially in the plane of the line 5a–5a in FIG. 5;

FIG. 5b is a fragmentary longitudinal sectional view, taken substantially in the plane of the line 5b–5b in FIG. 5a;

FIG. 5c is a fragmentary perspective view of the inner sleeve and drive key used in the embodiment of FIG. 5;

FIG. 5d is a group perspective view of the drive key and spring used in the embodiment of FIG. 5;

FIG. 5e is a fragmentary sectional detail showing a modified arrangement of the embodiment of FIG. 5;

FIG. 6 is a view, partly in elevation and partly in section, of another modified embodiment;

FIG. 6a is a cross-sectional view, taken substantially in the plane of the line 6a–6a of FIG. 6;

FIG. 6b is a fragmentary longitudinal sectional view, taken substantially in the plane of the line 6b–6b in FIG. 6a;

FIG. 6c is a view similar to FIG. 6a but showing another modification;

FIG. 7 is a fragmentary view of another modified form;

FIG. 8 is a fragmentary view of another modified form;

FIG. 9 is a fragmentary view of another modification;

FIG. 9a is a cross-sectional view taken substantially in the plane of the line 9a–9a in FIG. 9;

FIG. 9b is a sectional view, taken substantially in the plane of the line 9b–9b in FIG. 9; and FIG. 10 is a cross-sectional view of another modified embodiment.

Figure 1:
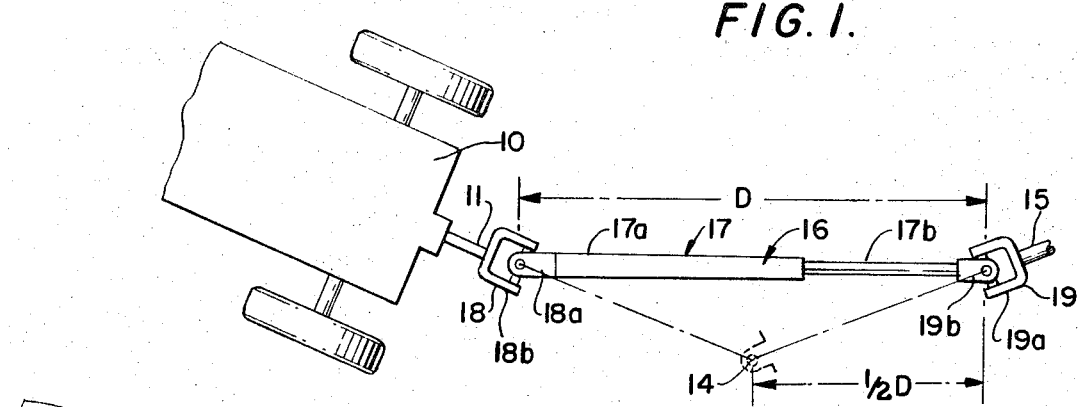
FIG. 1 is a diagramatic plan view of a drive line connection between the power take-off of a tractor and the driven shaft of an implement drawn thereby.
Figure 2:
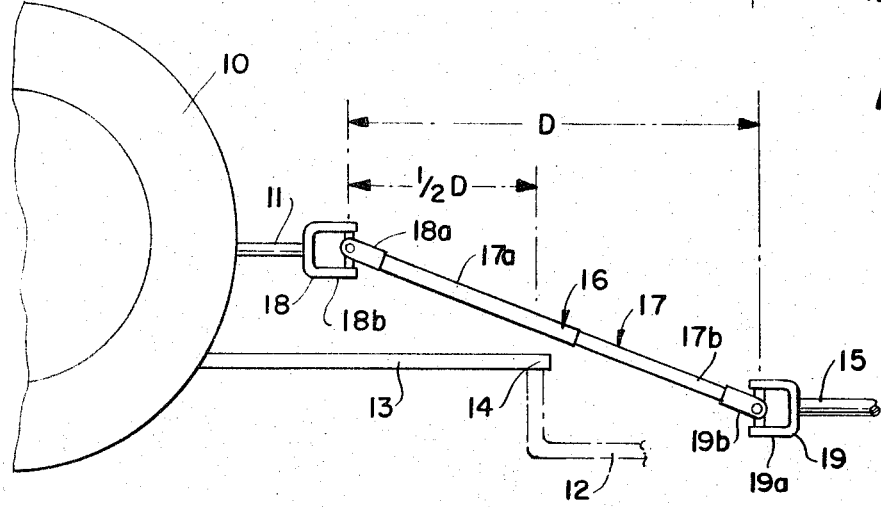
FIG. 2 is a diagramatic elevational view of the subject shown in FIG. 1.

Referring now to the accompanying drawings in detail, particularly to FIGS. 1 and 2, the numeral 10 designates a tractor having a power take-off shaft 11 projecting rearwardly therefrom. The reference numeral 12, (as for example in FIG. 3) designates an implement which is drawn by the tractor and is connected thereto by a conventional pivotal hitch 13, the pivot point of which is at 14. The implement 12, which may be a mowing machine, a combine, a cultivator, a snow blower, or the like, is power-driven by the power take-off shaft 11 of the tractor, and as such the implement has a driven shaft 15 which is operatively connected to the power take-off shaft 11 by a universally jointed telescopic drive line designated generally as 16.

The drive line 16 includes a telescopic shaft unit 17 consisting of two shaft members 17a, 17b which are slidably but non-rotatably telescoped together, and a pair of universal joints 18, 19 which are provided at the ends of the shaft unit 17. As illustrated, the joint 18 has a yoke 18a secured to the shaft member 17a, and a yoke 18b secured to the power take-off shaft 11. Similarly, the joint 19 has a yoke 19a secured to the driven shaft 15, and a yoke 19b secured to the shaft member 17b. In order to facilitate smooth and vibration-free operation of the entire drive line, it is desireable that the two universal joint yokes 18a and 19b at the ends of the telescopic shaft unit 17 be disposed in a common plane, so that in this context the torque transmission through the two joints is angularly in phase.

Moreover, for the same purpose, it is desirable for the drive line 16 to be geometrically coordinated with the hitch 13 so that the pivot point 14 of the hitch lies midway between the two universal joints 18, 19. This is illustrated in FIGS. 1 and 2 where the dimension D represents the distance between the spiders of the two joints 18, 19, while the dimension ½D corresponds to one-half that distance where the pivot 14 of the hitch 13 is located. As the result of this arrangement, when the tractor 10 and the drawn implement 12 deviate from a straight-line path, as for example in turning a corner, the angularity assumed by the hitch 13 at the pivot point 14 will be such that for any given angle, the two universal joints 18, 19 will have the same angular relationship to the straight line represented by the telescopic shaft unit 17. This, in conjunction with the coplanar relationship of the joint yokes 18a, 19b, will assure efficient and vibration-free transmission of torque through the drive line, which would not be possible if the aforementioned conditions did not obtain.

Figure 3:
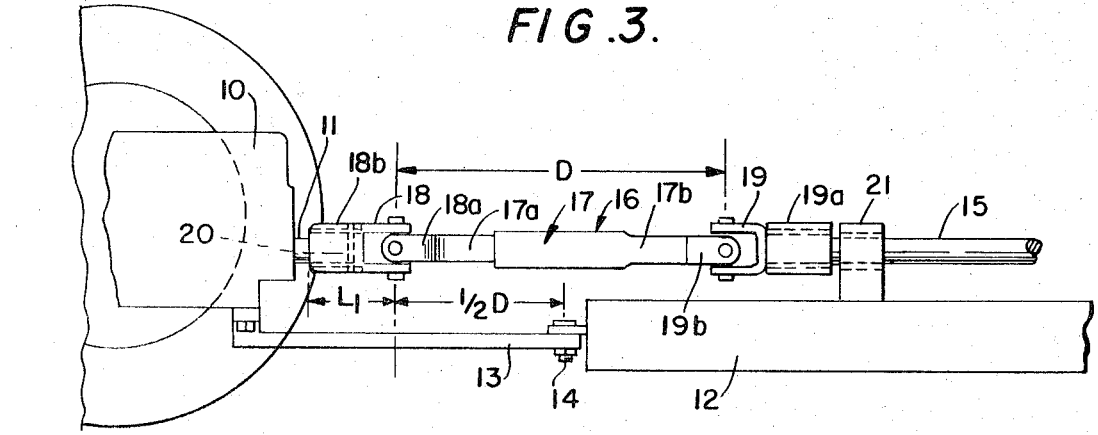
FIG. 3 is a fragmentary elevational view of the drive line connection with one embodiment of the over-running clutch.

As already indicated, it is desirable to embody an over-running clutch in the drive line 16 so that when the tractor is stopped, torque incident to inertia is not transmitted from the drawn implement back to the tractor. FIG. 3 illustrates one embodiment of this arrangement in relation to the diagramatic showings in FIGS. 1 and 2, wherein the yoke 18a of the front universal joint 18 is enlarged to accommodate an over-running clutch device 20 which may be of the same or similar type as that disclosed in the aforementioned U.S. Pat. No. 3,233,471. The over-running clutch device 20 functions between the power take-off shaft 11 of the tractor 10 and the yoke 18b of the universal joint 18 so that if the tractor is stopped and inertial rotation of the shaft 15 and drive line 16 continues, such rotation is interrupted at the over-running clutch 20 and is not fed back to the power take-off of the tractor. It will be apparent that in this embodiment, the dimension L1 of the joint yoke 18b which accommodates the clutch 20, should be short enough to maintain the forementioned dimension ½ D.

Still with reference to FIG. 3, as an alternative to the arrangement just described, the clutch 20 may be incorporated in the yoke 19a of the rear universal joint 19, rather than in the yoke 18b of the front joint 18. In either instance the result is the same, and since in either instance the over-running clutch is disposed outside (either forwardly or rearwardly) of the telescopic shaft unit 17, the coplanar relationship of the universal joint yokes 18a, 19b at the ends of the shaft unit 17 is not disturbed by operation of the over-running clutch. In other words, the joint yokes 18a, 19b remain coplanar at all times, regardless of the operation of the clutch and regardless of whether the clutch is disposed at the joint 18 or at the joint 19. The numeral 21 in FIG. 3 designates a bearing support for the driven shaft 15 on the implement 12.

FIGS. 4 and 4a show a modified embodiment in which the over-running clutch is disposed directly within the telescopic shaft unit 17, that is, between the two universal joints 18, 19, rather than forwardly or rearwardly thereof. With this arrangement there is the possibility of rotational displacement between the parts — as a result of operation of the clutch — so that the joint yokes 18a and 19b are brought out of coplanar relationship, which of course is not desirable. However, the arrangement of the invention avoids such a possibility and assures that the joint yokes are coplanar at all times during torque transmission.

Thus, in FIGS. 4 and 4a, the yoke 18a of the universal joint 18 is enlarged to provide an outer sleeve 22 which serves as a housing for the over-running clutch 23. For all practical purposes, the clutch 23 may be of the same type as shown in the aforementioned U.S. Pat. No. 3,233,471 and, as such, may comprise the outer sleeve 22 and an inner sleeve 24 having a splined connection 25 to a shaft member 26, along with a spring pin 27 which prevents axial movement of the inner sleeve 24 relative to the shaft member 26, in much the same manner as disclosed in the aforesaid patent. The inside of the outer sleeve 22 is provided at diametrically opposite points with a pair of cam-surfaced grooves 28 for reception of a pair of spring-pressed driving keys 29 carried by the inner sleeve 24, the over-running clutch operation being substantially the same as in the aforementioned U.S. Pat. No. 3,233,471 so that if the tractor is stopped and inertial rotation of the implement shaft 15 continues, the shaft member 26 and the inner sleeve 24 may rotate while the outer sleeve 22 and the power take-off shaft 11 remain stationary.

The splined shaft member 26 is slidably but non-rotatably telescoped in an internally splined shaft member 30 which is formed integrally with the yoke 19b of the universal joint 19, thus providing the desired telescopic and universally jointed characteristics of the drive line as a whole, as well as the facilities of the over-running clutch 23. Of course, it will be appreciated that the arrangement may be reversed by providing the clutch 23 on the yoke 19b instead of 18a, and providing the splined shaft member 30 on the yoke 18a instead of 19b. In any event, it is significant to note that by equiping the over-running clutch 23 with only one of the grooves 28 and driving keys 29, or with no more than two diametrically opposite grooves and keys, assurance is had that when after disengagement the clutch returns to its driving position (which may be at either 180° or 360° from its initial position), the universal joint yokes 18a and 19b are always in coplanar relation.

FIGS. 5, 5a, 5b, 5c and 5d illustrate another modified embodiment of the drive line in which the over-running clutch is disposed directly within the telescopic shaft unit 31. In this embodiment the shaft unit comprises an inner sleeve 32 connected to the joint 18 and slidably telescoped in an outer sleeve 33 connected to the joint 19, although conversely, the sleeve 32 may be connected to the joint 19 and the sleeve 33 to the joint 18. The outer sleeve 33 is formed with two diametrically opposite grooves 34 which extend the full length of the sleeve and are cam-surfaced as shown in FIG. 5a.

The grooves 34 in the outer sleeve 33 receive a pair of elongated driving dogs 35 which are positioned in diametrically opposite grooves 36 formed in the outer surface of the inner sleeve 32. Leaf springs 37 are placed in the grooves 36 under the driving dogs or keys 35 to urge the latter outwardly into the grooves 34 in the outer sleeve 33. The keys 35 are held in assembled relation on the inner sleeve 32 by a wire snap ring 38 which is placed in a circumferential groove 39 formed in the outer surface of the sleeve 32. The ring 38 also fits into a notch 40 formed in the keys 35, thus preventing the keys from sliding longitudinally relative to the sleeve 32. The notch 40 in the keys 35 is deep enough to permit the keys to move outwardly into the grooves 34 in the outer sleeve 33 under the action of the springs 37.

It will be apparent from the foregoing that when the keys 35 are projected outwardly into the grooves 34, they prevent relative rotation of the sleeves 32, 33 but permit relative sliding of the sleeves to effect the telescopic action. During such sliding, the keys 35 slide in the grooves 34. Inherently, the arrangement also provides an over-running clutch, in that during rotation of the inner sleeve 32 in one direction, the keys 35 in the grooves 34 drive the outer sleeve 33 in the same direction. However, if the outer sleeve is rotated in the opposite direction, the keys 35 become retracted from the grooves 34 into the grooves 36 against the action of the springs 37, so that rotation in that direction is not transmitted to the inner sleeve.

FIG. 5e shows a modified arrangement of the means for holding the keys 35 assembled in the grooves 36 of the inner sleeve 32. This involves the provision of an undercut 41 at the inner end of the groove 36 to receive a bevelled inner end 42 of the key 35, while the outer end of the key carries a circumferential snap ring 43. The outer diameter of the snap ring is equal to or smaller than the outside diameter of the sleeve 32 so that the latter is free to slide in the outer sleeve 33.

In another modified embodiment shown in FIGS. 6, 6a and 6b the over-running clutch 44 has an outer sleeve 45 which is fixed, as by welding 46, to one end of a tubular shaft member 47, the other end of the latter being connected to one of the universal joints, for example the joint 19. The other shaft member 48 of the telescopic shaft unit is connected to the other universal joint, for example the joint 18, and the shaft member 48 slides in a bore 49 formed in the inner sleeve 50 of the clutch. A pair of driving dogs 51 are provided at diametrically opposite points between the inner and outer clutch sleeves 50, 45 and are spring-pressed outwardly as already described in connection with the dogs 35.

The shaft member 48 and the bore 49 in the sleeve 50 may be square in section and an alignment button 52 may be provided to assure proper alignment and coplanar relationship of the universal joint yokes at the ends of the telescopic shaft unit. Alternatively, the cross-section of the shaft member 48 and of the bore 49 may be greater in one direction than in the other, as shown in FIG. 6c. A washer 54 is provided in the outer sleeve 45 at the outer end of the inner sleeve 50 and is held in place by a snap ring 55 so as to prevent the inner sleeve from sliding outwardly from the outer sleeve.

In another modification shown in FIG. 7 the outer clutch sleeve 56 is provided on the universal joint yoke 18a and a square telescopic shaft member 57 is secured, as by welding 58, in the inner clutch sleeve 59. The inner sleeve 59 is retained in the outer sleeve 56 by a washer 60 and a snap ring 61.

In FIG. 8 the telescopic shaft member 62 is rectangular in cross-section and hollow. It fits into a rectangular bore in the inner clutch sleeve 59 and the inner end of the member 62 is formed with an outturned flange 63 which is disposed at the inner end of the sleeve 59. A Teflon washer 64 is interposed between the flange 63 and the inner end of the outer sleeve 56 to reduce friction when the clutch is in operation. FIGS. 9, 9a and 9b show another modified arrangement of the overrunning clutch wherein an inner clutch sleeve 65 projects outwardly from an outer clutch sleeve 66 and is provided with a polygonal bore 67 to serve as a shaft member of the telescopic shaft unit. Driving keys 68 are provided at diametrically opposite locations between the inner and outer sleeves. Also, the inside of the outer sleeve and the outside of the inner sleeve are formed with opposing circumferential grooves defining ball races 69 for sets of ball bearings 70. These serve not only as end thrust bearings between the inner and outer clutch sleeves, but also prevent relative axial movement of the sleeves, so that retaining means such as the aforementioned means 60, 61 are not necessary. The outer sleeve 66 is equipped with removable plugs 71 which, when removed, facilitate insertion of the ball bearings 70 into the ball races 69.

FIG. 10 illustrates another modification in which the outer sleeve 72 of the clutch is in the form of a thin shell having a pair of lobes 73 spaced 180° apart. The lobes contain driving keys 74 and springs 75 which urge the keys inwardly into grooves 76 formed in the inner clutch sleeve 77. A short reinforcing washer or sleeve 78 is applied to the outer sleeve 72 in the area of the clutch keys in order to reinforce the lobes 73 in which the keys are seated. In this arrangement the keys move inwardly from the outer sleeve into the inner sleeve during driving, while in the other clutch arrangements hereinbefore described the keys move outwardly from the inner sleeve into the outer sleeve. However, the driving action of the over-running clutch is the same.

Attention is again directed to FIGS. 5a, 5b, 5c and 5d, and particularly to the driving dogs or keys 35 which are typical of those used in any of the clutch embodiments in FIGS. 5–10. The key 35 is elongated and undercut as at 79 to accommodate the leaf spring 37. A narrow side edge 80 of the key abuts a wall surface 81 of the groove 36 in the inner sleeve 32, while a narrow side edge 82 of the key abuts a wall surface 83 of the groove 34 in the outer sleeve 33. Thus the driving key transmits the driving forces through its greatest dimension (along its length) through the narrow side edges, therefore requiring the minimum removal of torque load conveying mass and providing economy in fabrication from small stock material, both in assembly and maintenance.

While in the foregoing there have been described and shown the preferred embodiments of the invention, various modifications and equivalents may be resorted to within the spirit and scope of the invention as claimed.

What is claimed is:

1. The combination of a tractor having a rearwardly projecting power take-off shaft, a power-driven implement drawn by said tractor and having a driven shaft, a pivotal hitch connecting said implement to the tractor, and a universally jointed telescopic drive line connecting said driven shaft of the implement to the power take-off shaft of the tractor, said drive line including a telescopic shaft unit and a pair of universal joints at the ends of said shaft unit, the combination being further characterized in that the pivot of said hitch is located at a point substantially midway between said universal joints, said drive line also including an over-running clutch embodied in said telescopic shaft unit, said universal joints having yokes disposed in a common plane at the ends of said telescopic shaft unit, and said over-running clutch having at least one but no more than two diametrically opposite driving positions whereby the universal joint yokes are always coplanar when the clutch is engaged.

2. A universally jointed telescopic drive line for connecting the power take-off of a tractor to a driven shaft of a power-driven implement drawn by the tractor, said drive line including a telescopic shaft unit, a pair of universal joints at the ends of said shaft unit, said joints having yokes at the ends of the shaft unit disposed in a common plane, and an over-running clutch embodied in the shaft unit, said clutch having at least one but no more than two diametrically opposite driving positions whereby the universal joint yokes are always coplanar when the clutch is engaged.

3. The device as defined in claim 2 wherein said clutch includes an outer sleeve connected to one of said universal joints, an inner sleeve in said outer sleeve, and a pair of spring-pressed driving keys disposed at diametrically opposite locations between said inner and outer sleeves, said telescopic shaft unit including a pair of slidably but non-rotatably telescoped shaft members one of which is connected to said inner sleeve and the other of which is connected to the other of said universal joints.

4. The device as defined in claim 2 wherein said clutch includes an outer sleeve connected to one of said universal joints and constituting one shaft member of said telescopic shaft unit, an inner sleeve connected to the other of said universal joints and constituting another shaft member of the telescopic shaft unit, said inner and outer sleeves being provided at diametrically opposite locations with opposing longitudinal grooves, and a pair of spring-pressed driving keys operatively positioned in said grooves whereby to permit telescopic sliding movement of the sleeves relative to each other and provide an over-running clutch action between the sleeves.

5. The device as defined in claim 2 wherein said telescopic shaft unit includes an outer shaft member connected to one of said universal joints, an inner shaft member connected to the other universal joint and extending freely into the outer shaft member, said clutch including an outer sleeve secured to the outer shaft member, an inner sleeve having the inner shaft member extending slidably but non-rotatably therethrough, and a pair of springpressed driving keys disposed at diametrically opposite locations between the inner and outer sleeves.

* * * * *